United States Patent
Parthasarathy

(10) Patent No.: US 9,152,200 B2
(45) Date of Patent: Oct. 6, 2015

(54) RESOURCE AND POWER MANAGEMENT USING NESTED HETEROGENEOUS HYPERVISORS

(75) Inventor: Mohan Parthasarathy, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1173 days.

(21) Appl. No.: 12/540,908

(22) Filed: Aug. 13, 2009

(65) Prior Publication Data

US 2010/0325454 A1    Dec. 23, 2010

(30) Foreign Application Priority Data

Jun. 23, 2009    (IN) .......................... 1473/CHE/2009

(51) Int. Cl.
   *G06F 9/46*      (2006.01)
   *G06F 1/32*      (2006.01)
   *G06F 9/455*     (2006.01)

(52) U.S. Cl.
   CPC .............. *G06F 1/3203* (2013.01); *G06F 1/329* (2013.01); *G06F 9/45558* (2013.01); *G06F 2009/45566* (2013.01); *Y02B 60/144* (2013.01)

(58) Field of Classification Search
   CPC .... G06F 9/45545; G06F 9/455; G06F 9/5077
   USPC ........................................................ 718/100
   See application file for complete search history.

(56) References Cited

U.S. PATENT DOCUMENTS

| | | | |
|---|---|---|---|
| 7,140,020 B2 | 11/2006 | McCarthy et al. | |
| 7,290,259 B2* | 10/2007 | Tanaka et al. | 718/1 |
| 7,975,267 B2* | 7/2011 | Bennett et al. | 718/1 |
| 2004/0199632 A1* | 10/2004 | Romero et al. | 709/226 |
| 2005/0060590 A1 | 3/2005 | Bradley et al. | |
| 2005/0108587 A1* | 5/2005 | Cooper et al. | 713/320 |
| 2006/0010450 A1* | 1/2006 | Culter | 718/104 |
| 2007/0050764 A1 | 3/2007 | Traut | |
| 2007/0271559 A1* | 11/2007 | Easton et al. | 718/1 |
| 2008/0270973 A1* | 10/2008 | Edwards et al. | 717/104 |
| 2009/0241109 A1* | 9/2009 | Vandegrift et al. | 718/1 |
| 2009/0260008 A1* | 10/2009 | Cho et al. | 718/1 |
| 2014/0115582 A1* | 4/2014 | Katiyar | 718/1 |

OTHER PUBLICATIONS

Liu, Pengcheng, et al., "Heterogeneous live migration of virtual machines," 2008, International Workshop on Virtualization Technology.*

"Introducing HP-UX 11i Virtual Partitions," Sep. 2007, Hewlett Packard.

* cited by examiner

*Primary Examiner* — Abdullah Al Kawsar
(74) *Attorney, Agent, or Firm* — Van Cott, Bagley, Cornwall & McCarthy

(57) ABSTRACT

A server includes a plurality of processors, at least some of the processors being partitioned into virtual partitions using a virtual partition hypervisor. At least one of the virtual partitions executes a virtual machine hypervisor to implement a plurality of virtual machines within said at least one of said virtual partitions. The server also executes a workload manager application configured to dynamically reallocate the processors among the virtual partitions.

17 Claims, 7 Drawing Sheets

RESOURCE AND POWER MANAGEMENT USING NESTED HETEROGENEOUS HYPERVISORS

RELATED APPLICATIONS

Pursuant to 35 U.S.C. 119(b) and C.F.R. 1.55(a), the present application corresponds to and claims the priority of Indian Patent Application No. 1473/CHE/2009, filed on Jun. 23, 2009, the disclosure of which is incorporated herein by reference in its entirety.

BACKGROUND

Modern servers and data centers are frequently faced with unpredictable workloads. For example, a particular application executed by a server may require a small amount of system resources for the majority of the time and experience relatively infrequent peaks of high resource demand for which more computing power is needed. One approach to hosting such applications has been to dedicate sufficient static hardware resources to each application to meet at least an anticipated peak demand for the application. An obvious drawback to this approach is the fact that most of the time, these dedicated resources will remain underutilized.

Virtualization allows the manager of server hardware the ability to make optimal use of his hardware resources with the flexibility of running multiple operating systems having different resource guarantees on the same hardware. Virtualization typically takes one of two general forms: a) virtual partitioning and b) virtual machines. With virtual partitioning, processing hardware is divided by software into independently autonomous partitions that function as separate, individual server devices. In contrast, virtual machines involve the use of shared hardware to implement multiple software implementations of separate computer devices.

To implement virtualization, both virtual partitioning and virtual machines generally require the use of a hypervisor—a software application that runs on the underlying hardware and manages the virtualization. However, occasions may arise where a user desires to incorporate features available from different hypervisors into the same virtualization solution. For example, a virtual partitioning hypervisor may provide the ability to dynamically allocate physical CPUs, memory, and I/O hardware resources to a virtual partition, but may not offer a sub-CPU granularity feature or the ability to run more than one type of operating system. On the other hand, a virtual machine hypervisor may provide the ability to run different types of operating systems, but not support the dynamic allocation of hardware resources.

Another problem with virtualization is that of resource and power management. As discussed above, some virtual partitioning solutions allow for the dynamic reallocation of hardware resources among the partitions according to the relative workloads of the partitions. Nevertheless, a virtual partition having a minimum amount of allocated hardware resources may still be underutilized. By contrast, virtual machine solutions generally do not allow the dynamic reallocation of hardware resources at all.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
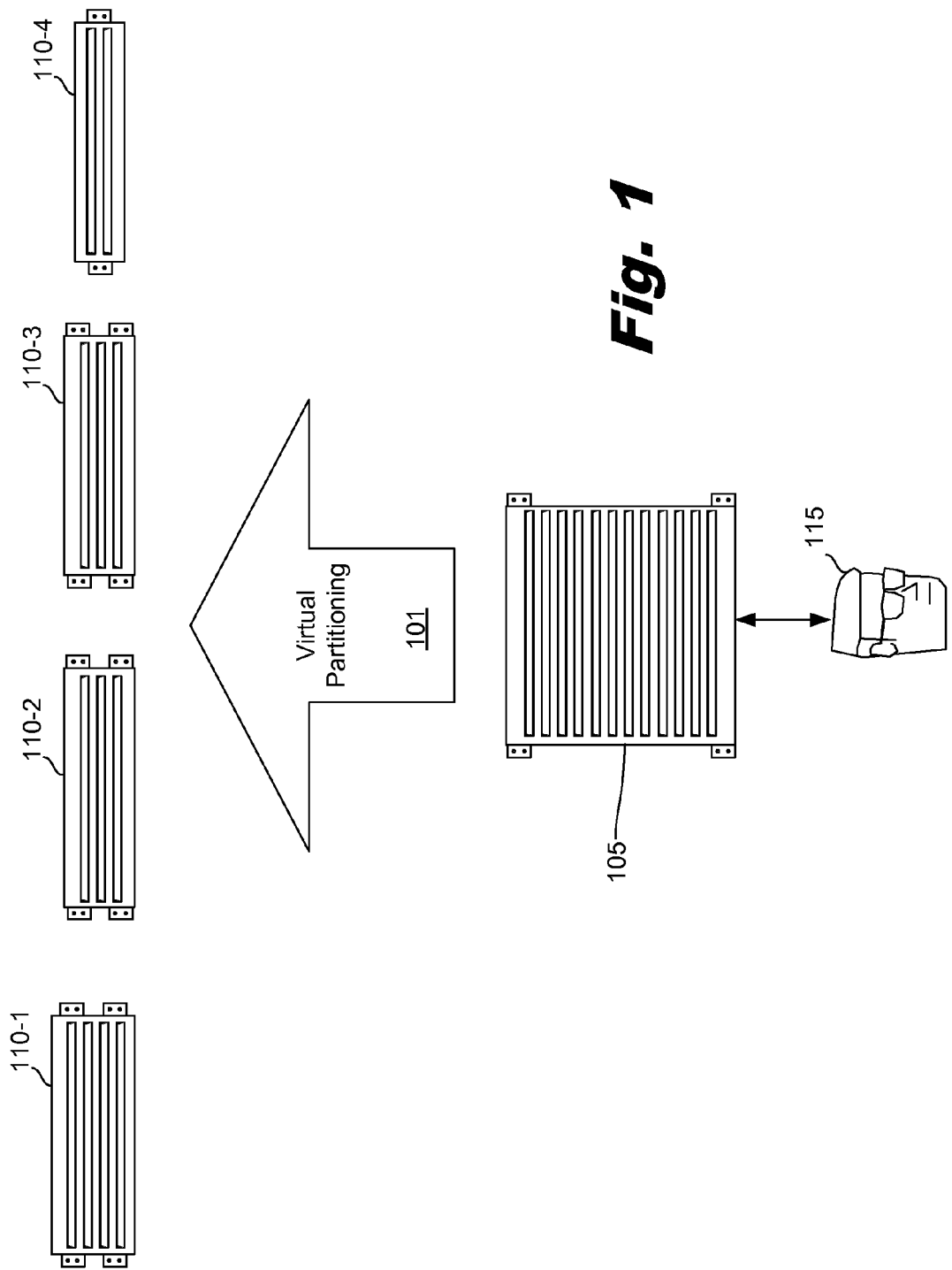
FIG. 1 is a diagram of an illustrative virtual partitioning of a server according to one exemplary embodiment of principles described herein.

The present specification discloses systems and methods of resource and power management in a server through the use of nested heterogeneous hypervisors. In these systems and methods, a server having a plurality of processors is partitioned into a plurality of virtual partitions using a virtual partition hypervisor. At least one of the virtual partitions is configured to execute a virtual machine hypervisor to implement a plurality of virtual machines within the virtual partition, and the virtual partition hypervisor is configured to dynamically reallocate the processors among the virtual partitions responsive to measured processor utilization within the virtual partitions.

The systems and methods disclosed in the present specification advantageously allow desirable features from both the virtual partition hypervisor and the virtual machine hypervisor to be incorporated into a complete virtualization solution. Moreover, the dynamic processor allocation by the virtual partition hypervisor advantageously allows for power and resource management for even the virtual machines.

As used in the present specification and in the appended claims, the term "partition" refers to an autonomous subset of server hardware that includes at least one processor, memory, and I/O resources on which a separate instance of an operating system can be executed.

As used in the present specification and in the appended claims, the term "hard partition" refers to a server partition defined by at least one entire physical modular component of a server.

As used in the present specification and in the appended claims, the term "virtual partition" or "soft partition" refers to a server partition defined by software.

As used in the present specification and in the appended claims, the term "virtual machine" refers to a software implementation of a computer that executes programs like a real computer. Accordingly, multiple autonomous virtual machines running separate operating systems may be implemented by the same hardware set.

As will be readily apparent to those having skill in the art, the present systems and methods may be implemented at least as a combination of hardware and software or as a computer program product in which computer readable code is stored on a tangible computer readable medium such that a computer may read the code thereon and execute a series of desired steps. Such computer readable media may include, but are in no ways limited to, random access memory (RAM), read only memory (ROM), flash memory, other nonvolatile and volatile electronic memory, magnetic storage media, optical storage media, and combinations thereof.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Referring now to FIG. 1, a block diagram is shown of an illustrative virtual partitioning (101) of a server (105) into a plurality of smaller autonomous virtual partitions (110-1 to 110-4). The virtual partitioning (101) of the server (105) effectively isolates various regions of the hardware resources of the server (105) into isolated operating environments (i.e., partitions) such that different systems and applications may coexist in the same server (105) or cluster while assuring complete privacy. This isolation of the operating environments results in the creation of individual autonomous virtual partitions (110-1 to 110-4) within the server (105) that operate as individual servers and are unaware of each other.

Each virtual partitions (110-1 to 110-4) may be dynamically created, modified, or deleted while the server (105) is running without interrupting non-related virtual partitions (110-1 to 110-4). The creation, modification, management, and removal of virtual partitions (110-1 to 110-4) may be managed by a virtual partitioning hypervisor (not shown) executed by the server (105). For example, the server (105) may be managed by a main operating system which executes the virtual partitioning hypervisor as a process. Alternatively, the virtual partitioning hypervisor may run directly on the server (105) as the main operating system of the server (105). An example of a virtual partitioning hypervisor suitable for the systems and methods of the present specification is the vPars hypervisor available from Hewlett Packard. Alternatively, any other virtual partitioning hypervisor may be used that may suit a particular application of the principles described herein.

In any event, a user (115) may access the virtual partitioning hypervisor through a user interface of the server (105) to configure the virtual partitioning (101) of the available hardware resources of the server (105). As shown in FIG. 1, the available hardware resources of the server (105) need not be distributed equally among the virtual partitions (110-1 to 110-4). A user (115) may initially allocate hardware resources to the virtual partitions (110-1 to 110-4) according to his or her best estimate of the relative processing needs and utilization of the virtual partitions (110-1 to 110-4), based on the applications to be run on each virtual partition (110-1 to 110-4). These allocations may be dynamically adjusted by the virtual partitioning hypervisor in response to fluctuating resource demands and utilization or by the user (115).

Figure 2:
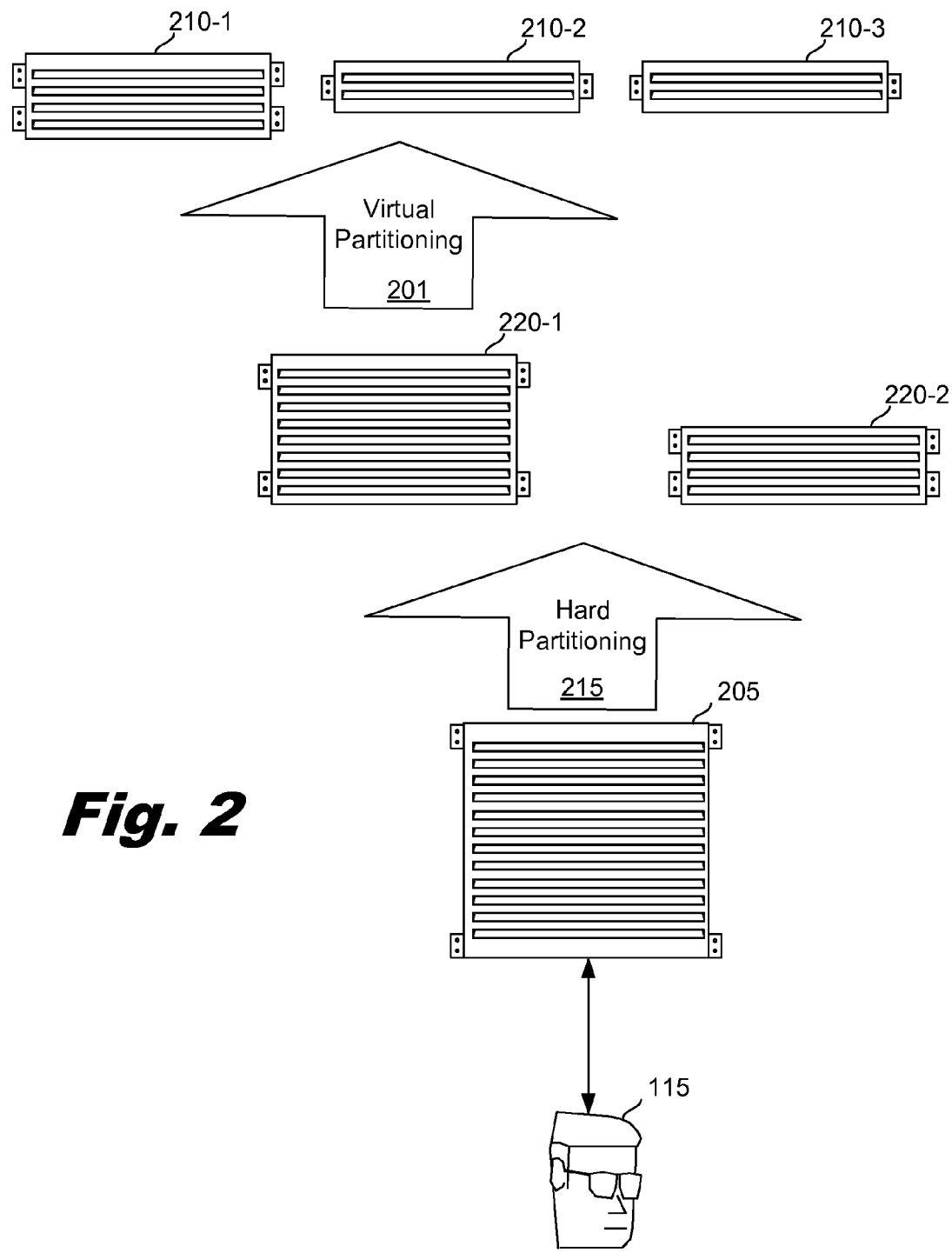
FIG. 2 is a diagram of an illustrative virtual and hard partitioning of a server according to one exemplary embodiment of principles described herein.

Referring now to FIG. 2, a block diagram is shown of an illustrative virtual partitioning (201) of a server (205) into a plurality of virtual partitions (210-1 to 210-3).

In contrast to the server (105, FIG. 1) described in relation to FIG. 1, the server (205) of FIG. 2 has been hard partitioned (215) into a plurality of hard partitions (220-1, 220-2) defined by the physical boundaries of one or more cells and one or more I/O chassis. As used in the present specification and the appended claims, the term "cell" refers to a circuit board that contains processors and memory and is controlled by an embedded controller. Each cell is a modular component in a server (205) or cluster. Hard partitioning may provide the benefit of electrical isolation between partitions.

In FIG. 2, a first hard partition (220-1) has been further divided into a plurality of virtual partitions (210-1 to 210-3) consistent with the principles described above in relation to FIG. 1. In certain embodiments, multiple hard partitions (220-1, 220-2) may be virtually partitioned (201) according to the needs of the system.

Figure 3:
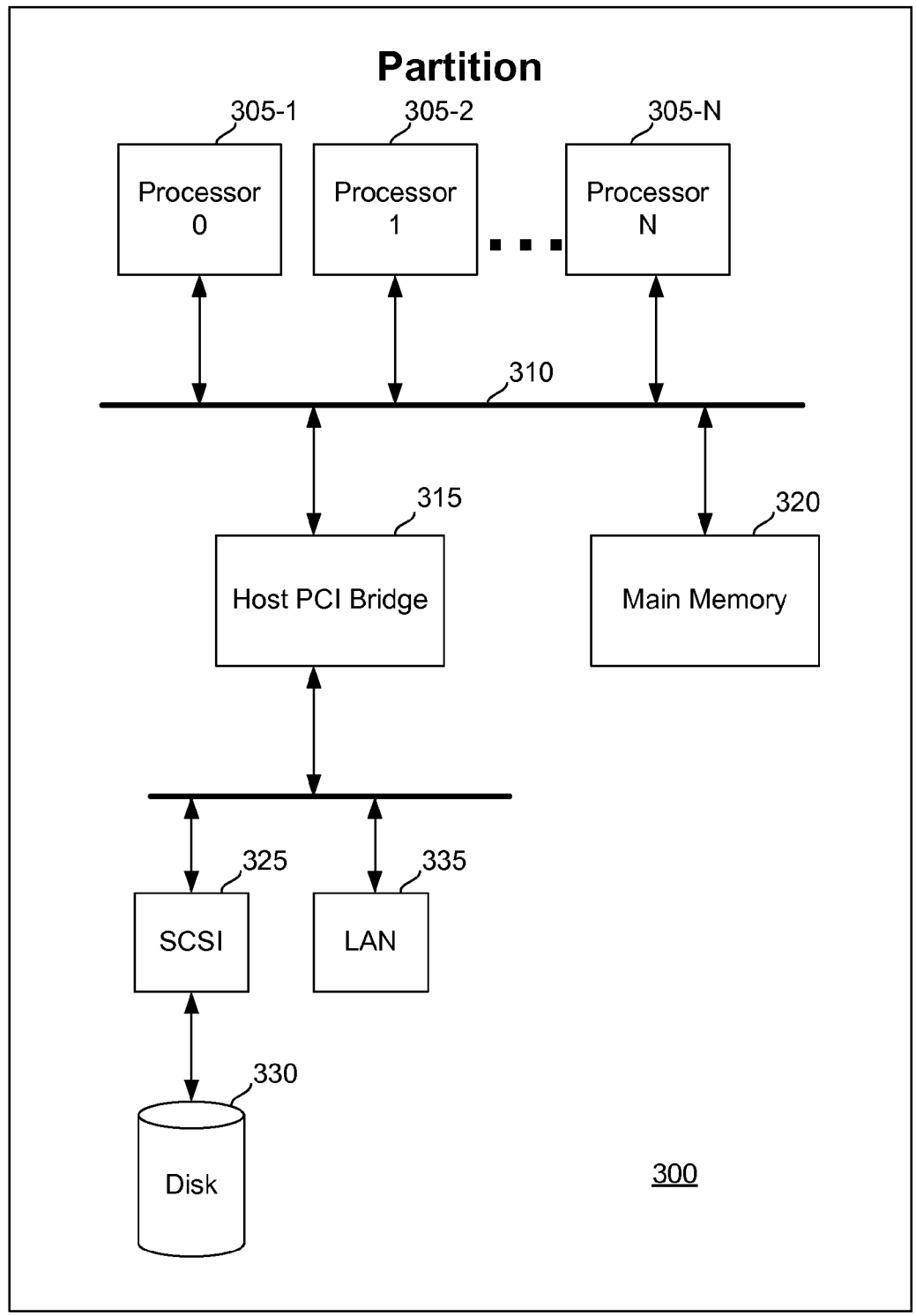
FIG. 3 is a block diagram of an illustrative partition of a server, according to one exemplary embodiment of principles described herein.

Referring now to FIG. 3, a block diagram of an illustrative partition (300) of a server (105, FIG. 1; 205, FIG. 2) is shown. Since virtual partitioning and hard partitioning differ only in the manner of partitioning and allocating resources (i.e., software vs. hardware boundaries), the partition (300) shown may be representative of either a hard partition (220-1, 220-2; FIG. 2) or a virtual partition (110-1 to 110-3, FIG. 1; 210-1 to 210-2, FIG. 2) of the server (105, FIG. 1; 205, FIG. 2).

The partition (300) includes a number of interrelated hardware resources allocated from the server (105, FIG. 1; 205, FIG. 2) and as such, the partition (300) behaves as an isolated, autonomous computer system. The partition (300) may include at least one processor (305-1 to 305-N). In a virtual partition, the number of processor (305-1 to 305-N) allocated to the partition (300) may vary as the virtual partitioning hypervisor dynamically allocates hardware resources among the virtual partitions according to resource demand and power management. In contrast, the number of processors (305-1 to 305-N) of a hard partition remains static. Where multiple processors (305-1 to 305-N) are present in a partition (300), one of the processors (305-1 to 305-N) will generally be designated as the main controlling processor which supervises the computations of the partition (300) and manages any remaining processors (305-1 to 305-N).

The processors (305-1 to 305-N) are communicatively coupled to a main bus (310). A host peripheral component interconnect (PCI) bridge (315) and the main memory (320) of the partition (300) may also be communicatively coupled to the main bus (310), and therefore to the processors (305-1 to 305-N). The host PCI bridge (315) may provide an interface between the main bus (310) and a peripheral bus (325) such that data may be transmitted between peripheral devices (330, 335) coupled to the peripheral bus (325) and the processors (305-1 to 305-N). The peripheral devices (330, 335) shown in FIG. 3 include at least one disk (330) and at least one network connection (335). As will be well understood in the art, additional or alternative peripheral devices may used with the partition (300) as may suit a particular application of the principles described herein.

Figure 4:
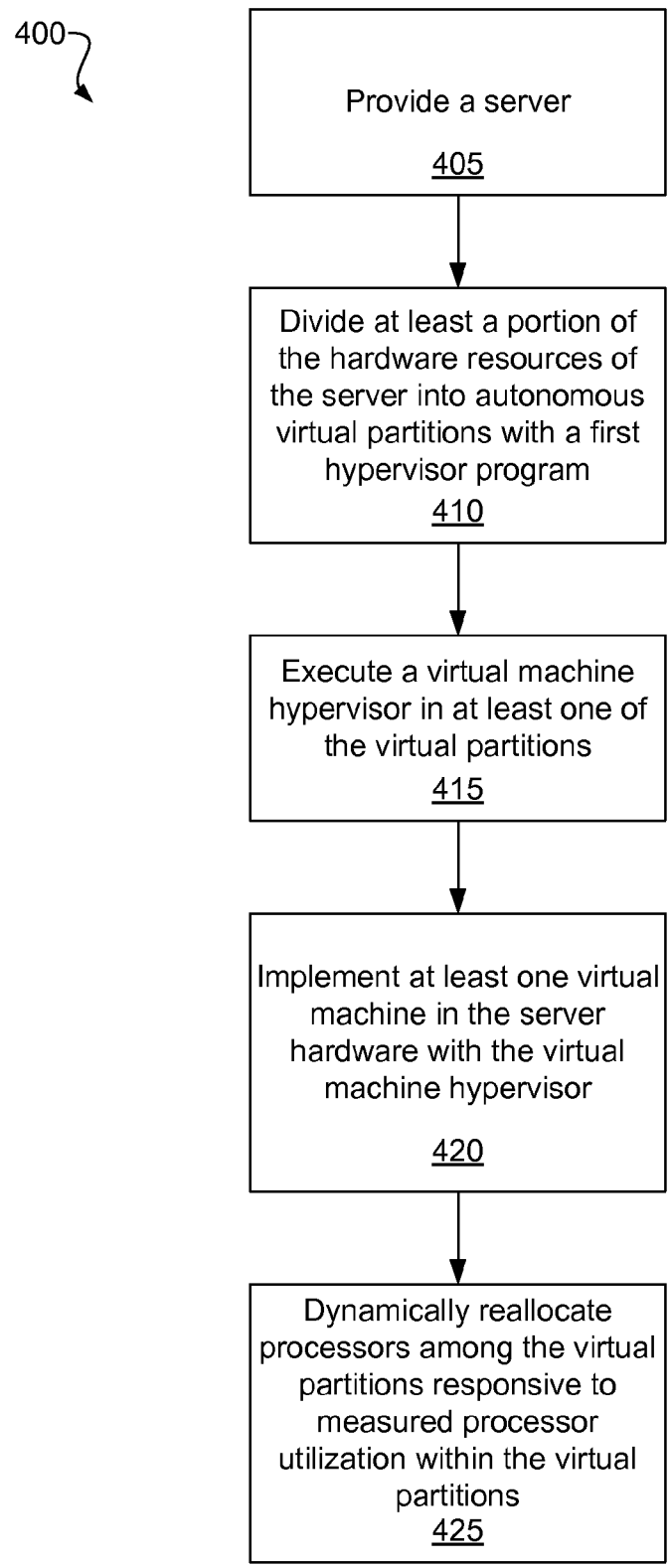
FIG. 4 is a flow diagram of an illustrative method of nesting heterogeneous hypervisors in a server, according to one exemplary embodiment of principles described herein.

Referring now to FIG. 4, a flow diagram is shown of a method (400) for nesting heterogeneous hypervisors in a server (105, FIG. 1; 205, FIG. 2). As will be demonstrated, the present method provides significant advantages in power and resource management coupled with the flexibility of features available in different hypervisors.

In the method (400), a server (105, FIG. 1; 205, FIG. 2) is provided (step 405) having divisible hardware resources. At least a portion of these hardware resources are divided (step 410) into autonomous virtual partitions using a first hypervisor program executed by the server (105, FIG. 1; 205, FIG. 2). As discussed above, these virtual partitions may function as individual, isolated computers that are blind to each other's operations.

A virtual machine hypervisor is then loaded to and executed (step 415) in at least one of the virtual partitions to implement a plurality of virtual machines within the virtual partition (step 420). The virtual machine hypervisor is run by the processor(s) of the virtual partition, and the virtual machines may be implemented through shared use of the hardware resources allocated to the virtual partition. Thus, from a hypervisor point of view, the virtual partition hypervisor would run on top of the server hardware, and the user would create multiple virtual partitions, with at least one of the virtual partitions becoming a virtual machine host hypervisor that is able to run multiple guest operating systems on top of its corresponding virtual partition(s).

Finally, the method (400) includes dynamically allocating (step 425) hardware resources among the virtual partitions. This allows a user to divide his or her server into virtual partitions and run virtual machines on some or all of these partitions while giving the ability to move resources from one virtual partition to another on a need and priority basis. Such fine grained flexing of resources may allow virtual machine hypervisors running in these partitions to expand and contract on the directions of a workload management orchestrator and in turn allow the guest virtual machines to make use of the extra available resources when the high priority applications running in these guest virtual machines require it. One example of such a workload management orchestrator is the Global Workload Manager tool (gWLM) available from Hewlett Packard, but any such tool may be used as may suit a particular application of the principles described herein.

In certain embodiments, the workload management orchestrator may also optimize power usage by moving resources between virtual partitions and powering down unused partitions created by these resource migrations.

One clear advantage of the method (400) of FIG. 4 over current environments is that the ability to run virtual machines within dynamically manageable virtual partitions gives a user the added benefits of features available only in virtual machine implementations and not in the partition environments, while preserving the ability to dynamically allocate hardware resources to the virtual machine hypervisor. For example, a user may be able to run a virtual Linux machine on a virtually partitioned system where the virtual partitions do not natively support the Linux operating system and maintain the ability to dynamically allocate resources to the virtual partition executing the virtual machine hypervisor hosting the Linux operating system.

Another advantage of the present method (400) is that physical resources can be added or deleted from the host operating system of the virtual partition executing the virtual machine hypervisor such that the virtual machine hypervisor has the flexibility to use potentially all the resources in the system while providing isolation between chose partitions.

Yet another advantage of the present method (400) lies in the fact that the total server power usage can be controlled by moving idle processors out of the virtual partition and into virtual partitioning hypervisor where they are put in a lower power state and then migrated back to a virtual partition when the demand increases.

Figure 5:
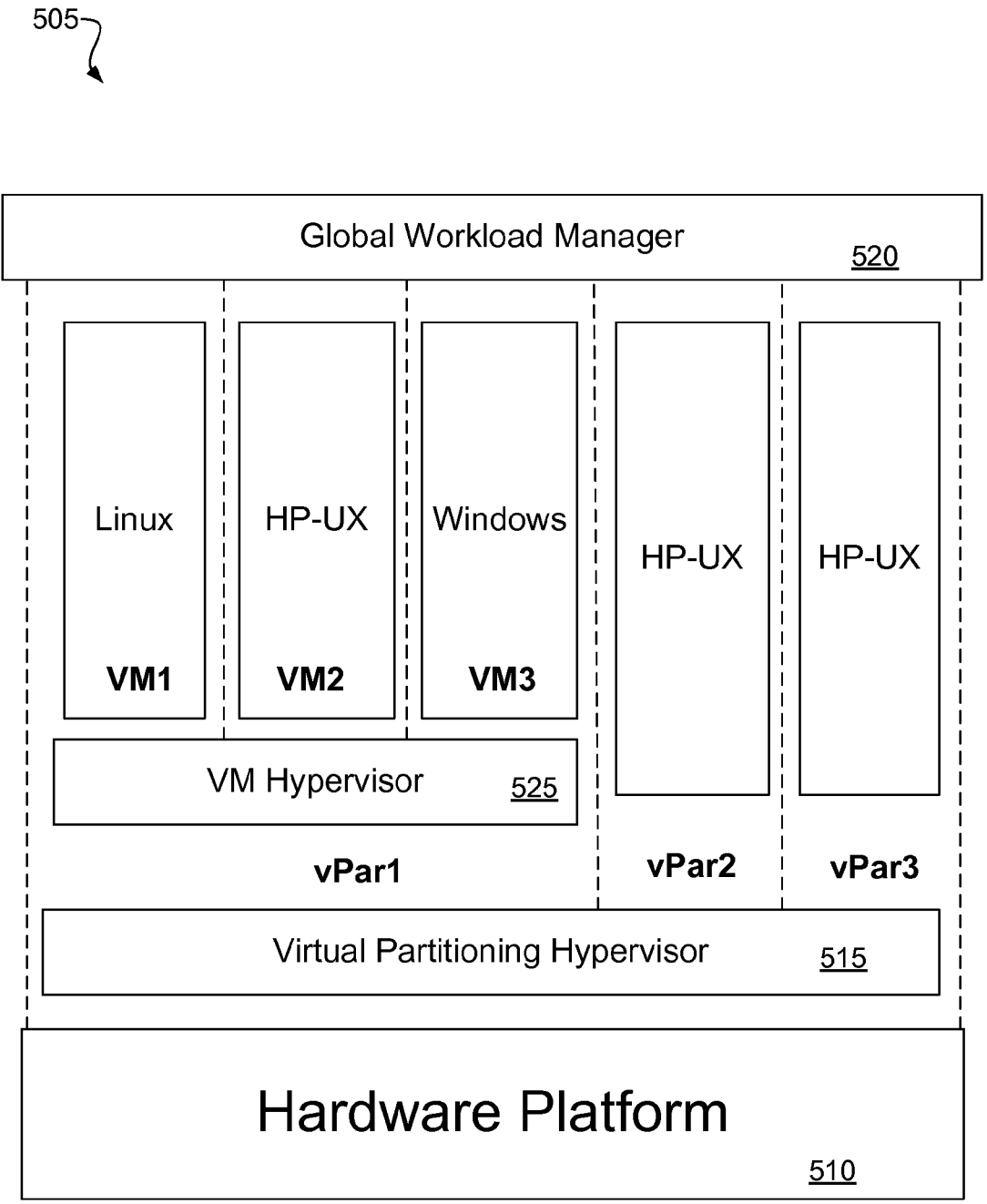
FIG. 5 is a block diagram of illustrative nested heterogeneous hypervisors running on a server, according to one exemplary embodiment of principles described herein.

Referring now to FIG. 5, a block diagram is shown of an illustrative server (505) executing nested heterogeneous hypervisors consistent with the method (400, FIG. 4) corresponding to FIG. 4. The server (505) includes a hardware platform (510) comprising all of the processing circuitry possessed by the server (505). The hardware platform (505) executes a virtual partitioning hypervisor (515), which allocates the hardware resources of the server (505) into multiple virtual partitions (vPar1, vPar2, vPar3). While the present embodiment illustrates three virtual partitions (vPar1, vPar2, vPar3), this number may be changed dynamically by the user. Any number of virtual partitions may be used that may suit a particular application of the principles described herein.

The hardware platform also executes a global workload manager (520) configured to monitor the utilization of hardware resources allocated to the virtual partitions (vPar1, vPar2, vPar3) and dynamically reallocate hardware resources among the virtual partitions (vPar1, vPar2, vPar3) to conserve power and ensure that an anticipated or adequate level of service is being provided to each of the virtual partitions (vPar1, vPar2, vPar3).

The virtual partitions (vPar2, vPar3) of the present example are configured to execute separate instances of the HP-UX operating system and do not support other operating systems. Thus, two of the virtual partitions (vPar2, vPar3) in the present example are configured to merely execute separate instances of the HP-UX operating system and applications.

On the other hand, the first virtual partition (vPar1) is configured to execute a virtual machine hypervisor (525) in its HP-UX environment, thereby enabling the hardware resources of the first virtual partition (vPar1) to be shared in implementing three virtual machines (VM1, VM2, VM3). As shown in FIG. 5, the virtual machines (VM1, VM2, VM3) may execute different operating systems, with the first virtual machine (VM1) executing the Linux operating system, the second virtual machine (VM2) executing the HP-UX operating system, and the third virtual machine (VM3) executing the Windows operating system.

Figure 6:
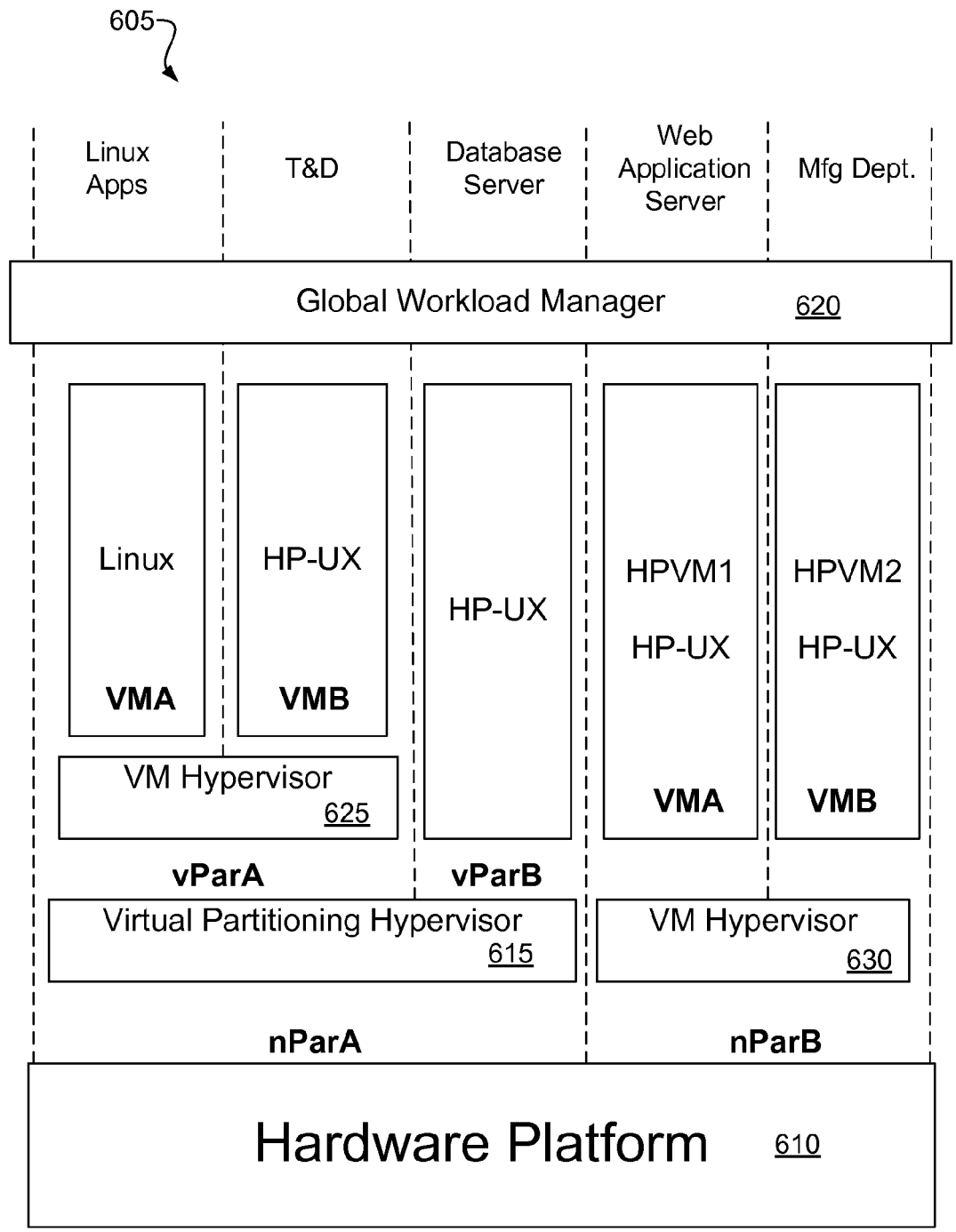
FIG. 6 is a block diagram of illustrative nested heterogeneous hypervisors running on a server, according to one exemplary embodiment of principles described herein.

Referring now to FIG. 6, a block diagram is shown of another illustrative server (605) executing nested heterogeneous hypervisors consistent with the method (400, FIG. 4) corresponding to FIG. 4. Like the server (505, FIG. 5) described above, the server (605) of the present example includes a hardware platform (610). The hardware platform (610) may be divided into separate hard partitions (nParA, nParB), as described above.

A first hard partition (nParA) may execute a virtual partitioning hypervisor (615) that divides the first hard partition into a plurality of virtual partitions (vParA, vParB). A global workload manager (620) may monitor processor usage among the virtual partitions (vParA, vParB) and dynamically reallocate hardware resources among the virtual partitions (vParA, vParB) as necessary.

A first of the virtual partitions (vParA) may execute a virtual machine hypervisor (625) that implements two virtual machines (VMA, VMB) through using the hardware resources of the first virtual partition (vParA). A first of these virtual machines (VMA) may be configured to execute the Linux operating system and host Linux applications, while a second (VMB) may execute the HP-UX operating system and be used for testing and development of the system. A second virtual partition (vParB) of the first hard partition (nParA) may simply execute the HP-UX operating system and be used as a database server.

The second hard partition (nParB) may execute a virtual machine hypervisor (630) that is not nested within a virtual partition (vParA, vParB). The virtual machine hypervisor (630) of the second hard partition (nParB) may implement an HP-UX virtual machine (VMC) used as a web application server and an HP-UX virtual machine (VMD) for a manufacturing department.

Figure 7:
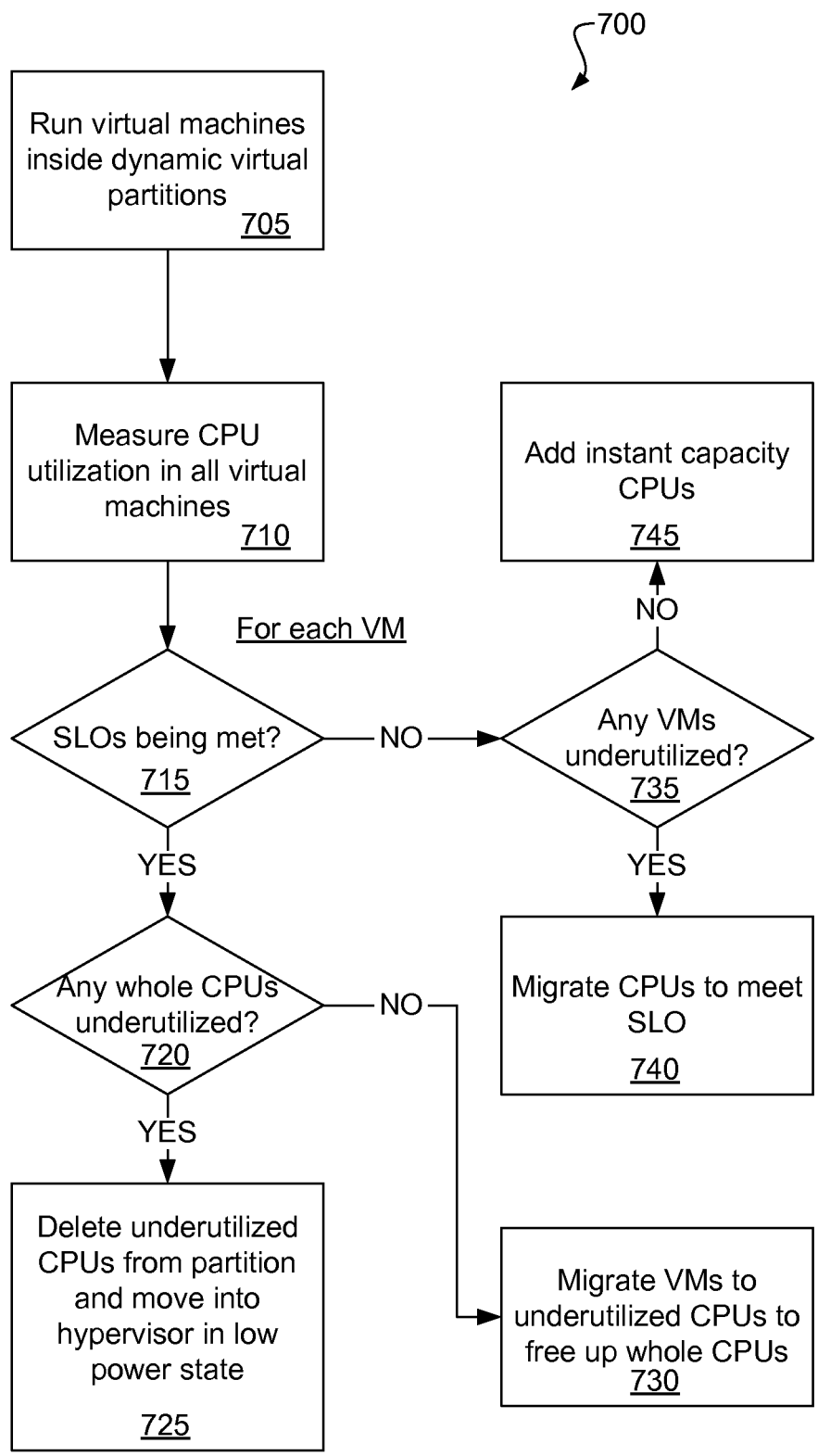
FIG. 7 is a flow diagram of an illustrative method of resource and power management in a server running nested heterogeneous hypervisors, according to one exemplary embodiment of principles described herein.

Referring now to FIG. 7, a flow diagram is shown of an illustrative method (700) of resource and power management in a server running nested heterogeneous hypervisors. The method (700) may be performed, for example, by a Workload Manager (520, FIG. 5; 620, FIG. 6) consistent with principles described previously. In certain embodiments, the method (700) may be repeated at regular intervals.

The method (700) begins by running (step 705) virtual machines inside dynamic virtual partitions as described above. The CPU utilization in each of the virtual machines is measured (step 710) to determine (decision 715) whether the service level objective (SLO) configured by a user for that virtual machine.

For example, consider a virtual partition having 2 allocated CPUs that executes a virtual machine hypervisor hosting two virtual machines, wherein each virtual machine has an SLO goal of 0.8 CPU. In the event that one of the virtual machines were measured (step 710) as utilizing 0.1 CPU and the other of the virtual machines were measured (step 710) as utilizing 0.8 CPU, the total CPU usage would only be 0.9 CPU. Thus, it would be determined (decision 715, YES) that the SLO for both virtual machines is being met and that one of the CPUs in the virtual partition is underutilized (decision 720, YES). Accordingly, the manager entity would delete (step 725) one CPU from the virtual partition and allocate it to the virtual partition hypervisor, where the CPU would be maintained in a low power state until needed. If it were determined (decision 720, NO) that no whole CPUs were underutilized, one or more of the virtual machines could be migrated (step 730) to one or more underutilized CPU in the virtual partition where possible. Doing so, may free up a CPU that could be deleted from the virtual partition and moved to the virtual partition hypervisor in a low power state.

If it is determined (decision 715, NO) that the SLOs of the virtual machines in a virtual partition are not being met a determination may be made (decision 735) as to whether any of the virtual machines in the virtual partition are underutilized. If so (decision 735, YES), one or more underutilized CPUs being used by other virtual machines within the virtual partition may be migrated (step 740) to the virtual machine(s) that is not meeting its SLO. Otherwise (decision 735, NO), instant capacity CPUs may be moved (step 745) from the virtual partitioning hypervisor to the virtual partition and used to meet the processing demands of the virtual machine that is not meeting its SLO.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A server comprising:
a plurality of processors, at least one of said processors being partitioned into a plurality of virtual partitions using a virtual partition hypervisor executed by said server, each of the plurality of virtual partitions using isolated hardware resources;
wherein at least one of said plurality of virtual partitions is configured to execute a virtual machine hypervisor to implement a plurality of virtual machines within said at least one of said plurality of virtual partitions, in which the plurality of virtual machines share use of hardware resources allocated to said at least one of said virtual partitions;
wherein said server is also configured to execute a workload manager application configured to:
dynamically reallocate said processors among said plurality of virtual partitions responsive to measured processor utilization within said plurality of virtual partitions;
analyze a measured utilization of processors in said plurality of virtual machines to determine if the processors allocated to the at least one of said virtual partitions are underutilized; and
wherein said virtual partition hypervisor is configured to:
based on said determination that said processors in said at least one of said plurality of virtual partitions are underutilized;
migrate a superfluous processor from said at least one of said virtual partitions to said virtual partition hypervisor; and
place said superfluous processor in a low power state; and
wherein said virtual partition hypervisor and said virtual machine hypervisor are by nested heterogeneous hypervisors.

2. The server of claim 1, wherein said workload manager application is further configured to compare said measured processor utilization within each virtual partition with at least one Service Level Objective (SLO) associated with said virtual partition to determine whether said processors in said virtual partition are underutilized or overutilized.

3. The server of claim 2, wherein said virtual partition hypervisor is further configured to, responsive to a determination that said processors in said virtual partition are overutilized, migrate at least one processor from said virtual partition hypervisor to said virtual partition.

4. The server of claim 1, wherein said virtual partition hypervisor is further configured to measure a processor utilization of said plurality of virtual machines individually.

5. The server of claim 4, wherein said virtual machine hypervisor is configured to dynamically allocate central processing units (CPUs) in said virtual partition among said plurality of virtual machines responsive to measured CPU utilization of said virtual machines.

6. The server of claim 1, in which the virtual partitions are located on a hard partition of the server.

7. The server of claim 1, in which the virtual partition hypervisor is located on a hard partition of the server.

8. A method of resource and power management in a server comprising a plurality of processors, comprising:
dividing at least a portion of said processors into autonomous virtual partitions with a virtual partitioning hypervisor program executed by said server, each of the virtual partitions using isolated hardware resources;
executing a virtual machine hypervisor in at least one of said virtual partitions, in which said at least one of said virtual partitions implements a plurality of virtual machines within said at least one of said virtual partitions and the plurality of virtual machines share use of hardware resources allocated to said at least one of said virtual partitions;
dynamically reallocating, by a workload manager application executed by said server, said processors among said virtual partitions responsive to measured processor utilization within said virtual partitions;
analyzing, by the workload manager application, a measured utilization of processors in said plurality of virtual machines to determine if the processors allocated to the at least one of said virtual partitions are underutilized;

migrating, by the virtual partitioning hypervisor, a superfluous processor from said at least one of said virtual partitions to said virtual partition hypervisor based on said determination that the that said processors in said at least one of said virtual partitions are underutilized; and placing, by the virtual partitioning hypervisor, said superfluous processor in a low power state; and wherein said virtual partitioning hypervisor and said virtual machine hypervisor are nested heterogeneous hypervisors.

9. The method of claim 8, wherein said dynamic reallocation of said processors among said virtual partitions is performed by a workload manager application executed by said server.

10. The method of claim 8, further comprising comparing said measured processor utilization within each virtual partition with at least one Service Level Objective (SLO) associated with said virtual partition to determine whether said processors in said virtual partition are underutilized or overutilized.

11. The method of claim 10, further comprising, responsive to a determination that said processors in said virtual partition are overutilized, migrate at least one processor from said virtual partition hypervisor to said virtual partition.

12. The method of claim 8, wherein said virtual machine hypervisor is configured to dynamically allocate central processing units (CPUs) in said virtual partition among said plurality of virtual machines responsive to measured CPU utilization of said virtual machines.

13. The method of claim 8, in which the virtual partitions are located on a hard partition of the server.

14. The method of claim 8, in which dynamically reallocating said processors among said virtual partitions is based on power consumption.

15. The method of claim 8, in which dynamically reallocating said processors among said virtual partitions is based on the availability of hardware resources.

16. A computer program product, comprising:
a non-transitory computer readable medium comprising computer executable code stored thereon, said computer executable code comprising:

computer executable code configured to divide at least a portion of a plurality of processors in a server into autonomous and isolated virtual partitions with a virtual partition hypervisor executed by said server, in which said virtual partitions do not share resources;

computer executable code configured to execute a virtual machine hypervisor in at least one of said virtual partitions, in which the virtual machine hypervisor is operated through a processor of said at least one of said virtual partitions;

computer executable code configured to run virtual machines inside said at least one of said virtual partitions, in which said virtual machines share resources;

computer executable code configured to dynamically reallocate, by a workload manager application executed by said server, said processors among said virtual partitions responsive to measured processor utilization within said virtual partitions;

computer executable code configured to, via said workload manager application, analyze a measured utilization of processors in said virtual machines to determine if the processors allocated to the at least one of said virtual partitions are underutilized;

computer executable code configured to, via said virtual partition hypervisor, migrate a superfluous processor from said at least one of said virtual partitions to said virtual partition hypervisor based on said determination that the that said processors in said at least one of said virtual partitions are underutilized; and computer executable code configured to, via said virtual partition hypervisor, place said superfluous processor in a low power state;

wherein said virtual partitioning hypervisor and said virtual machine hypervisor are nested heterogeneous hypervisors that perform different function.

17. The computer program product of claim 16, wherein said computer executable code further comprises:
computer executable code configured to compare said measured processor utilization within each virtual partition with at least one Service Level Objective (SLO) associated with said virtual partition to determine whether said processors in said virtual partition are underutilized or overutilized.

* * * * *